United States Patent
Abramson et al.

(10) Patent No.: US 8,259,922 B2
(45) Date of Patent: Sep. 4, 2012

(54) EMULATION OF PRIVATE BRANCH EXCHANGE BEHAVIOR

(75) Inventors: Sandra R. Abramson, Freehold, NJ (US); Stephen M. Milton, Freehold, NJ (US); William Joseph Toth, Jr., Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1566 days.

(21) Appl. No.: 11/685,182

(22) Filed: Mar. 12, 2007

(65) Prior Publication Data

US 2008/0227439 A1 Sep. 18, 2008

(51) Int. Cl.
*H04M 3/42* (2006.01)
*H04M 7/00* (2006.01)

(52) U.S. Cl. ............... 379/225; 379/207.02; 455/414.1; 455/554.1; 455/555

(58) Field of Classification Search ............... 379/225, 379/207.02, 211.02, 231–234; 455/414.1, 455/417, 554.1, 555
See application file for complete search history.

(56) References Cited

U.S. PATENT DOCUMENTS

| | | | |
|---|---|---|---|
| 5,550,906 A | | 8/1996 | Chau et al. |
| 5,978,687 A * | | 11/1999 | Maenpaa ............... 455/555 |
| 6,285,879 B1 * | | 9/2001 | Lechner et al. ......... 455/432.3 |
| 6,430,283 B1 | | 8/2002 | Wille |
| 6,571,108 B1 * | | 5/2003 | Otsuka et al. ............ 455/433 |
| 6,775,272 B2 | | 8/2004 | Galvin et al. |
| 6,950,507 B1 | | 9/2005 | Kaplan |
| 7,082,119 B1 | | 7/2006 | Tamsil |
| 2003/0112953 A1 | | 6/2003 | DuCharme |
| 2006/0159246 A1 | | 7/2006 | Abramson et al. |
| 2006/0239252 A1 | | 10/2006 | Kantak et al. |

FOREIGN PATENT DOCUMENTS

| | | |
|---|---|---|
| EP | 1761011 A1 | 3/2007 |
| GB | 2198011 A | 6/1988 |
| GB | 2355624 A | 4/2001 |

OTHER PUBLICATIONS

Steckert, "DE Application No. 10 2008 032 865.0-31 Office Action May 26, 2009", , Publisher: DPMA, Published in: DE.
Jared Stokes, "GB Patent Application No. GB0804490.1 Search and Examination Report", Jun. 27, 2008, Published in: GB.
Steckert, "DE Application No. 10 2008 013 932.7 Office Action Aug. 4, 2010", , Publisher: DPMA, Published in: DE.

* cited by examiner

*Primary Examiner* — Harry Hong
(74) *Attorney, Agent, or Firm* — Maldjian Law Group LLC; John P. Maldjian, Esq.; Alexander D. Walter, Esq.

(57) ABSTRACT

An apparatus and methods are disclosed for use by organizations that have PBXs at a plurality of sites. The invention pertains to cell phone calls from an to his or her "home" private branch exchange. For example, an employee who works at the Chicago branch office might call the Chicago office's PBX to invoke a feature such as setting up call forwarding, retrieving voice mail, etc. In the illustrative embodiment, such calls might be automatically and transparently directed to another PBX when it is advantageous to do so (e.g., for the purposes of security, reducing toll charges, because of unavailability of a particular PBX, etc.) Factors that might be used to determine whether to re-direct a call and to which PBX to re-direct a call include the day and time of the call, the network that the cell phone is currently connected to, etc.

20 Claims, 6 Drawing Sheets

Figure 2 (PRIOR ART)

| PBX On-Premises Telephone Number | Off-Premises Telephone Number |
|---|---|
| 732-555-0102 x11 | 201-555-1236 |
| 732-555-0102 x12 | 908-555-3381 |
| ⋮ | ⋮ |
| 732-555-0102 x99 | 212-555-6784 |

EMULATION OF PRIVATE BRANCH EXCHANGE BEHAVIOR

FIELD OF THE INVENTION

The present invention relates to telecommunications in general, and, more particularly, to emulating the behavior of a private branch exchange at a second private branch exchange.

BACKGROUND OF THE INVENTION

An organization that desires to provide employees at one location with telephones has, in general, two options. First, the organization can acquire one telephone and one telephone line per employee from the telephone company. Second, the organization can acquire one telephone per employee, a small number of telephone lines from the telephone company, and a piece of equipment that enables the employee's telephones to share the small number of telephone lines. In general, the second option is substantially less expensive than the first option, and the piece of equipment that enables the employees' telephones to share the small number of telephone lines is called a "private-branch exchange" or "PBX." In addition, private-branch exchanges typically provide a variety of useful telecommunications features to their users, such as call forwarding, three-way conferencing, and so forth.

FIG. 1 depicts a schematic diagram of telecommunications system 100 in the prior art. Telecommunications system 100 comprises affiliated off-premises telecommunications terminals 101-1 through 101-X, wherein X is a positive integer; unaffiliated off-premises telecommunications terminal 102; affiliated on-premises telecommunications terminals 103-1 through 103-X; private branch exchange telephone system 104; and telecommunications network 105, interconnected as shown.

The terms "affiliated" and "unaffiliated," as they apply to the off-premises terminals, refer to whether an off-premises terminal is affiliated with an on-premises terminal (i.e., a terminal served by private branch exchange 104). The relationship of an on-premises terminal (e.g., terminal 103-1, etc.) with an affiliated off-premises terminal (e.g., terminal 101-1, etc.) is described below and with respect to FIG. 2, with regards to extending a received call to one or both terminals.

Private branch exchange 104 is capable of switching incoming calls from telecommunications network 105 (e.g., the Public Switched Telephone Network, etc.) via one or more transmission lines to any of on-premises terminals 103-1 through 103-N. Private branch exchange 104 is also capable of handling outgoing calls from any of on-premises terminals 103-1 through 103-N to telecommunications network 105 via one or more transmission lines that connect private branch exchange 104 to telecommunications network 105.

Private branch exchange 104 is capable of also extending an incoming call to a telephone number in telecommunications network 105, in addition to switching the incoming call to on-premises terminal 103-n, wherein n is an integer between 1 and N, inclusive. The telephone number that is extended-to in telecommunications network 105 corresponds to an affiliated terminal 101-n.

In addition, private branch exchange 104 is capable of providing telecommunications features that enable the forwarding of calls, the transferring of calls, conferencing, etc. Typically each user of an on-premises terminal 103-n can create a customized profile that is stored at private branch exchange 104 and indicates to private branch exchange 104 how to present information to and respond to signal from on-premises terminal 103-n and its affiliated terminal 101-n. A customized profile might include information such as defaults for various settings and options, what language to use for voice prompts, what menu items to present, how to associate number keys to menu items, and so forth.

FIG. 1 also depicts the address spaces that are relevant to telecommunications network 100 in the prior art. The term "address space" refers to an addressable region of telephone service. Address space 111 represents the addressable region served by telecommunications network 105. Address space 112 represents the addressable region served by private branch exchange 104.

Private branch exchange 104 acts as a "bridge" between address space 111 and address space 112. When a calling party places a call to someone served by private branch exchange 104, the calling party uses a dialing sequence that includes a telephone number that belongs to telecommunications network 105 and residing in address space 111. As part of the dialing sequence, the calling party also uses an extension number that allows access to one of the on-premises telecommunications terminals that reside within address space 112.

Thus an on-premises telephone number is one that exists within the address space of the private branch exchange, and an off-premises telephone number is one that exists within the address space of the Public Switched Telephone Network.

Some private branch exchanges enable the user of an on-premises terminal to associate an off-premises terminal's telephone number (e.g., the user's cell phone number, etc.) with the on-premises terminal's telephone number for features such as automatic call forwarding. In such instances the off-premises terminal's telephone number is said to be mapped to the on-premises terminal's telephone number. Typically a private branch exchange that provides such a mapping feature stores the mappings in a table, such as the one shown in FIG. 2.

SUMMARY OF THE INVENTION

The present invention is applicable to organizations that have private branch exchanges (PBXs) at two or more different sites, and pertains to calls from an affiliated off-premises terminal (typically, an employee's cell phone) to its "home" private branch exchange. For example, an employee who works at an organization's New York branch office might call the New York office's PBX to invoke a feature such as setting up call forwarding, canceling call forwarding, retrieving voice mail, and so forth.

In accordance with the illustrative embodiment, when an employee places such a call, the call might be automatically and transparently directed to another PBX of the organization when it is advantageous to do so. Re-directing a call to another private branch exchange might be advantageous for a number of reasons, such as for the purposes of security, for reducing toll charges, because of unavailability of a particular private branch exchange (perhaps based in part on the time zones in which the PBXs are located), etc. Furthermore, the issue of whether or not it is advantageous to re-direct a call, as well as which PBX would be advantageous for the re-direction, might depend on factors such as the day and time at which the call is placed, the network that the affiliated terminal is currently connected to (e.g., Verizon Wireless U.S., Vodafone U.K., etc.), and so forth.

In accordance with the illustrative embodiment, when a call to an employee's home private branch exchange is redirected to a different private branch exchange, the re-direction is done automatically and transparently in such a manner that the user is unaware of its occurrence. In addition, the present invention enables the "non-home" private branch exchange to interact with the user in the same manner as the home private branch exchange (e.g., with the same default values, preferred language, etc.). As a result, the re-directed call appears no different to the user than a call to his or her home private branch exchange.

In the illustrative embodiment the desired functionality is provided via software on the organization's private branch exchanges and on the affiliated terminals (i.e., employees' cell phones). In addition, the illustrative embodiment employs a profile database that stores the private branch exchange profiles for each of the organization's employees, as well as an authentication server for authenticating calls to any of the organization's private branch exchanges, and a centralized voice mail server for storing employees' voice mail.

The illustrative embodiment comprises: (a) receiving at a telecommunications terminal an input for placing a first call to a first private branch exchange, wherein the telephone number M of the telecommunications terminal (i) is not in the address space of the first private branch exchange, and (ii) is mapped to a telephone number N in the address space of the first private branch exchange; (b) placing, in response to the input, a second call from the telecommunications terminal to a second private branch exchange whose address space does not contain M and does not contain a telephone number to which M is mapped; and (c) receiving at the telecommunications terminal, in response to the second call, a signal from the second private branch exchange in accordance with a profile associated with the telephone number N.

BRIEF DESCRIPTION OF THE DRAWINGS

FIG. 2 depicts an illustrative table that maps off-premises telephone numbers to on-premises telephone numbers, in accordance with the prior art.

DETAILED DESCRIPTION

Figure 1:
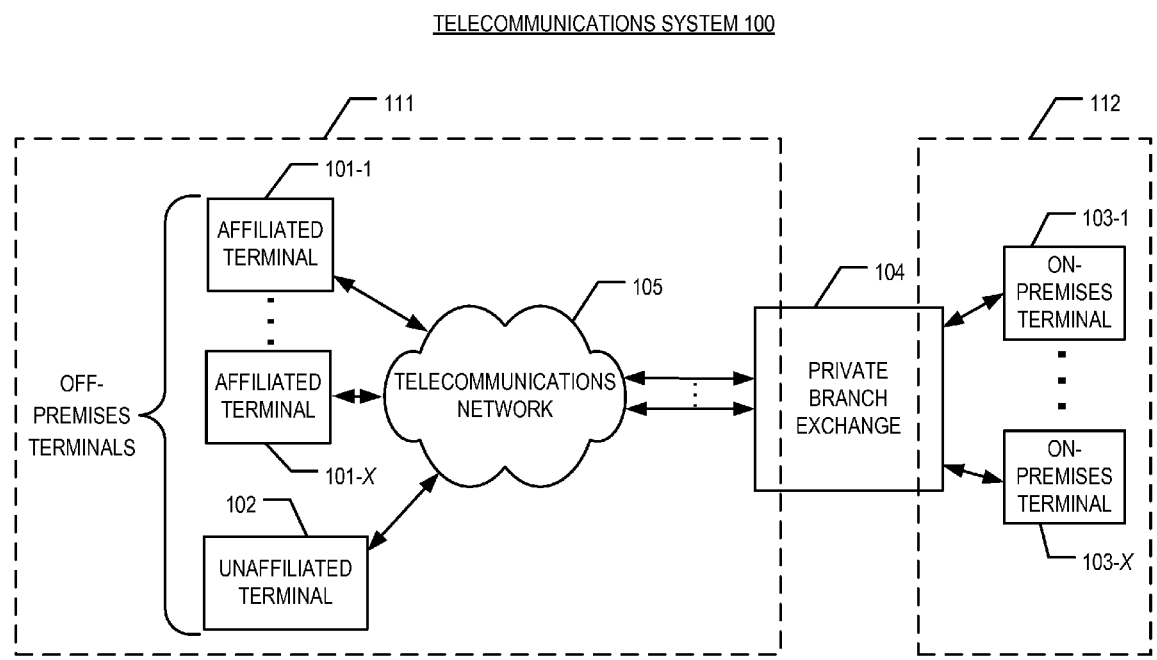
FIG. 1 depicts a schematic diagram of telecommunications system 100, in accordance with the prior art.
Figure 3:
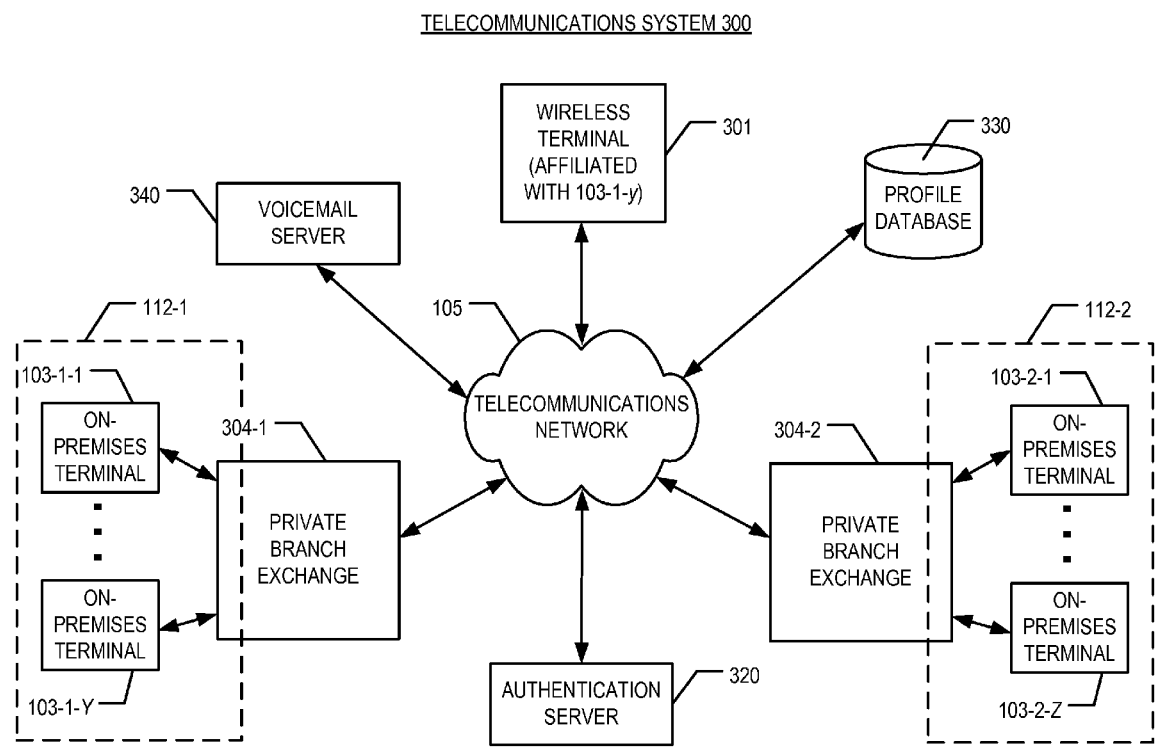
FIG. 3 depicts a schematic diagram of telecommunications system 300, in accordance with the illustrative embodiment of the present invention.

FIG. 3 depicts a schematic diagram of telecommunications system 300, in accordance with an illustrative embodiment of the present invention. Telecommunications system 300 comprises telecommunications network 105, private branch exchange 304-1, on-premises terminals 103-1-1 through 103-1-Y, private branch exchange 304-2, on-premises terminals 103-2-1 through 103-2-Z, authentication server 320, profile database 330, voicemail server 340, and off-premises wireless telecommunications terminal 301, interconnected as shown.

Private branch exchanges 304-1 and 304-2 provide all the functionality of private branch exchange 104 of the prior art, and are also capable of performing the tasks of FIG. 6, described below.

On-premises terminals 103-1-1 through 103-1-Y are the same as on-premises terminals 103 of the prior art, and are associated with private branch exchange 304-1. As shown in FIG. 3, the telephone numbers of on-premises terminals 103-1-1 through 103-1-Y exist in address space 112-1.

On-premises terminals 103-2-1 through 103-2-Z are the same as on-premises terminals 103 of the prior art, and are associated with private branch exchange 304-2. As shown in FIG. 3, the telephone numbers of on-premises terminals 103-2-1 through 103-2-Z exist in address space 112-2.

Authentication server 320 is a server that is capable of presenting authentication challenges to telecommunications terminals, of receiving responses from challenged terminals, and of determining the correctness of responses, as is well-known in the art. The manner in which authentication server 320 performs its authentication functions in accordance with the illustrative embodiment is described below and with respect to FIG. 6.

As will be appreciated by those skilled in the art, in some other embodiments of the present invention, authentication might be performed by an entity other than a centralized authentication server—such as a user's home private branch exchange, or a "local" authentication server attached to the home PBX, or perhaps the private branch exchange to which a call is re-directed—and it will be clear to those skilled in the art, after reading this specification, how to make and use such embodiments.

Profile database 330 is a database of PBX profiles for every on-premises telephone number of the organization (in the illustrative embodiment, the telephone numbers of terminals 103-1-1 through 103-1-Y and terminals 103-2-1 through 103-2-Z). The profiles stored in profile database 330 contain individualized information about a user's preferences when interacting with its home private branch exchange 304, such as the user's preferred language, preferred timeout durations, customized menus, etc., as is well-known in the art.

In accordance with the illustrative embodiment, the profile for a particular on-premises telephone number is stored at the home private branch exchange 304 for that telephone number in addition to profile database 330. It will be clear to those skilled in the art, after reading this specification, how to make and use other embodiments of the present invention in which profiles might be stored only at profile database 330, or only at the home private branch exchange 304, or at one or more "non-home" private branch exchanges in addition to the home PBX. Furthermore, the tradeoffs involved in fault-tolerance, consistency, and read-vs.-write performance for each possible implementation are well-understood by those skilled in the art.

Voicemail server 340 is a server that stores voicemail for all of the on-premises telephone numbers of the organization (in the illustrative embodiment, the telephone numbers of terminals 103-1-1 through 103-1-Y and terminals 103-2-1 through 103-2-Z). As will be appreciated by those skilled in the art, in some embodiments of the present invention, voicemail might be stored "locally" at each private branch exchange 304 instead of at a centralized server, and it will be clear how to make and use such embodiments after reading this specification.

Figure 4:
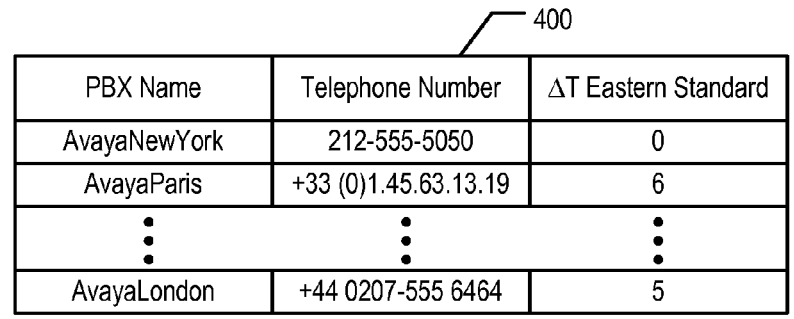
FIG. 4 depicts illustrative table 400 that is stored at affiliated wireless telecommunications terminal 301, in accordance with the illustrative embodiment of the present invention.

Off-premises wireless telecommunications terminal 301 is a wireless telecommunications terminal (e.g., cell phone, etc.) that is affiliated with one of the on-premises terminals 103 of private branch exchange 304-1 (say 103-1-y, where y is an integer between 1 and Y, inclusive). In accordance with the illustrative embodiment, wireless telecommunications terminal 301 is capable of storing a table of the organization's private branch exchanges and related information, such as illustrative table 400 shown in FIG. 4, and of performing the tasks of FIG. 5, described below.

As will be appreciated by those skilled in the art, for the purposes of simplicity telecommunications system 300 of the illustrative embodiment has only two private branch exchanges 304-1 and 304-2. However, it will be clear to those skilled in the art, after reading this specification, how to make and use embodiments of the present invention for organizations that have P private branch exchanges, where P is an integer greater than two.

Figure 5:
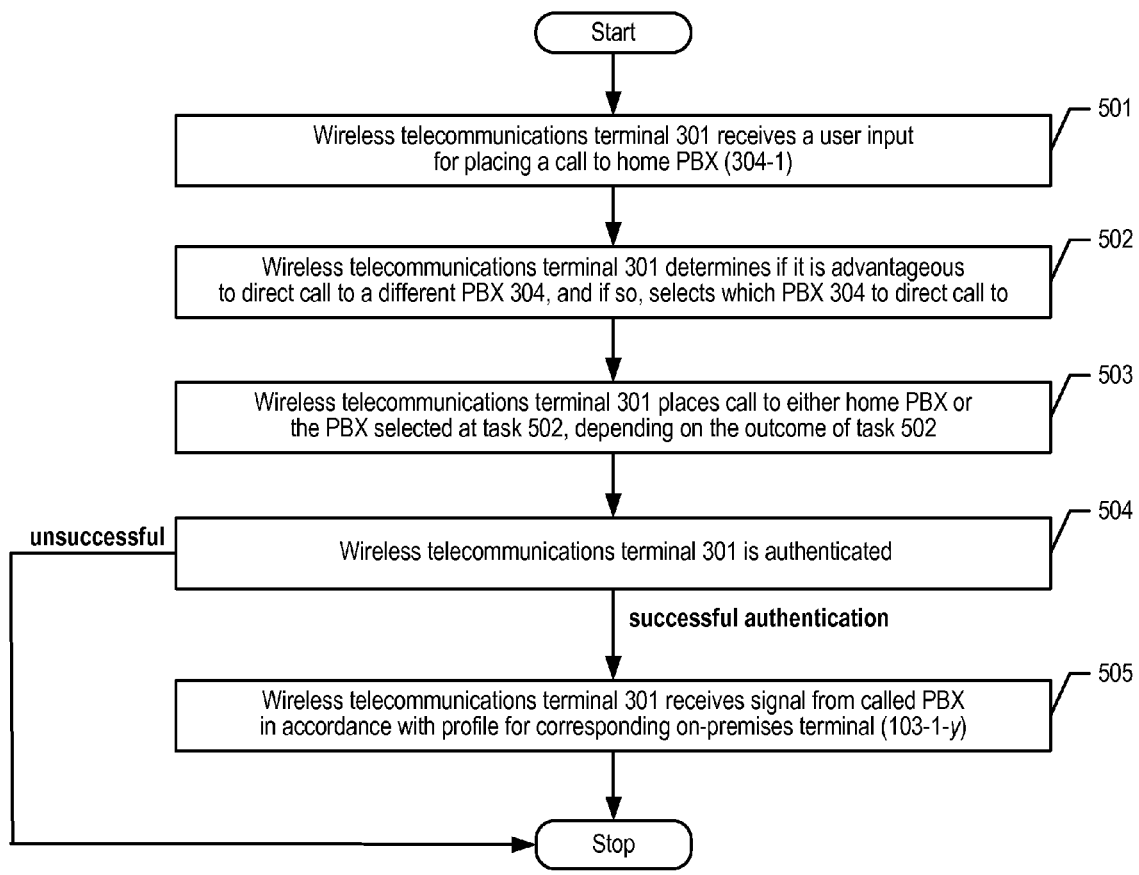
FIG. 5 depicts a flowchart of the salient tasks of affiliated telecommunications terminal 301, as shown in FIG. 3, in accordance with the illustrative embodiment of the present invention.

FIG. 5 depicts a flowchart of the salient tasks of wireless telecommunications terminal 301, in accordance with the illustrative embodiment of the present invention. It will be clear to those skilled in the art which tasks depicted in FIG. 5 can be performed simultaneously or in a different order than that depicted.

At task 501, wireless telecommunications terminal 301 receives an input from its user for placing a call to his or her home private branch exchange (i.e., the private branch exchange 304 whose address space contains a telephone number to which wireless terminal 301's telephone number is mapped). In the illustrative embodiment, wireless terminal 301's home private branch exchange is 304-1 because wireless terminal 301 is affiliated with on-premises terminal 103-1-y.

At task 502, wireless telecommunications terminal 301 determines if it is advantageous to direct the call to a different private branch exchange, and if so, selects which private branch exchange to direct the call to (in the illustrative embodiment, the only choice is 304-2). As discussed above, the determination of whether it is advantageous to direct a call to a different PBX could be based on a number of factors such as security, toll charges, PBX availability, etc.; similarly, the selection of a particular private branch exchange for the redirected call could be based on factors such as the day and time of the call, the network that wireless terminal 301 is currently connected to, etc.

At task 503, wireless telecommunications terminal 301 places a call to either the home private branch exchange or the private branch exchange selected at task 502, depending on the outcome of task 502.

At task 504, wireless telecommunications terminal 301 is authenticated, in well-known fashion. In accordance with the illustrative embodiment, wireless terminal 301 is authenticated by authentication server 320 via a challenge/response mechanism, in well-known fashion. As will be appreciated by those skilled in the art, in some embodiments of the present invention the challenge/response mechanism might require input from the user of terminal 301 (e.g., a username and password, etc.), while in some other embodiments, wireless terminal 301 might be authenticated without any user input—and perhaps, without the user's awareness. As described above, it will be clear to those skilled in the art how to make use alternative embodiments of the present invention in which task 504 is performed by one or more entities other than authentication server 320.

If the authentication of task 504 is successful, execution continues at task 505, otherwise execution of the method of FIG. 5 terminates.

At task 505, wireless telecommunications terminal 301 receives a signal from called private branch exchange 304-k in accordance with the appropriate profile (i.e., the profile for on-premises terminal 103-1-y with which wireless terminal 301 is affiliated.) After task 505, the method of FIG. 5 terminates.

Figure 6:
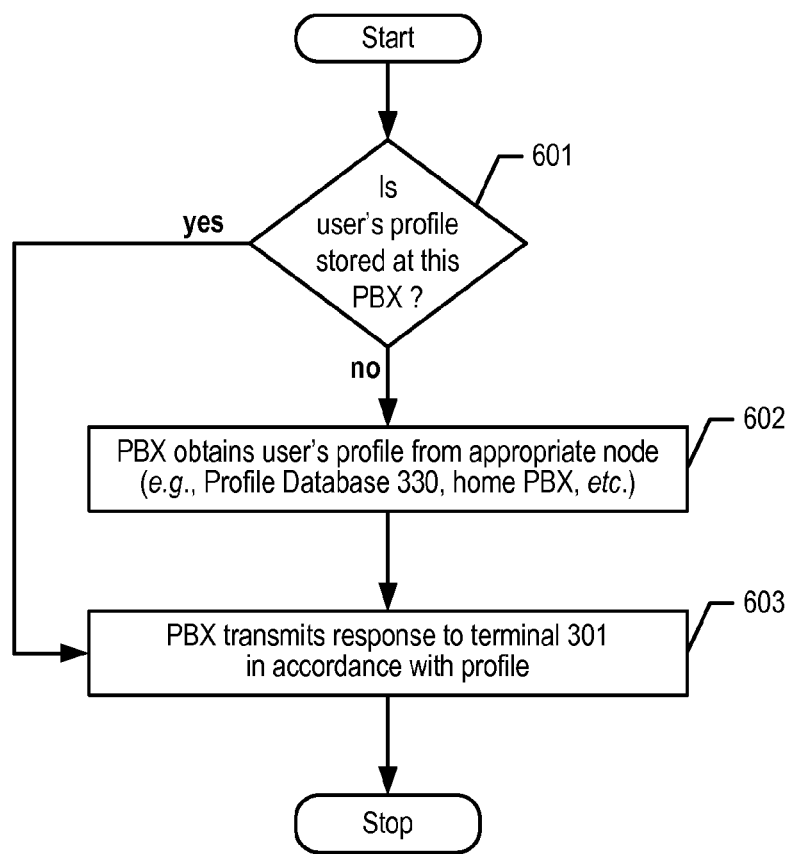
FIG. 6 depicts a flowchart of the salient tasks of private branch exchange 304-k, in accordance with the illustrative embodiment of the present invention.

FIG. 6 depicts a flowchart of the salient tasks of private branch exchange 304-k, where k is an integer from 1 to P, inclusive, and P is the number of private branch exchanges in the organization (two in the illustrative embodiment). It will be clear to those skilled in the art which tasks depicted in FIG. 6 can be performed simultaneously or in a different order than that depicted.

At task 601, private branch exchange 304-k checks whether the appropriate user profile (i.e., the profile for on-premises terminal 103-1-y with which wireless terminal 301 is affiliated) is stored at private branch exchange 304-k. In accordance with the illustrative embodiment, this profile is stored only at its home PBX and in profile database 330. However, as discussed above, in some other embodiments of the present invention a profile might be stored at one or more other private branch exchanges 304—perhaps cached at a particular PBX during a previous call from wireless terminal 301, or perhaps replicated for fault-tolerance or performance issues.

If the profile is stored at private branch exchange 304-k, execution continues at task 603, otherwise execution proceeds to task 602.

At task 602, private branch exchange 304-k obtains the profile from the appropriate node (e.g., profile database 330, the home private branch exchange, etc.) in well-known fashion.

At task 603, private branch exchange 304-k transmits a response to wireless telecommunications terminal 301 in accordance with the profile, in well-known fashion.

After task 603, the method of FIG. 6 terminates.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) receiving at a telecommunications terminal an input for placing a call to a first private branch exchange, wherein a telephone number M of said telecommunications terminal
      (i) is not in the address space of said first private branch exchange, and
      (ii) is mapped to a telephone number N in the address space of said first private branch exchange;
   (b) placing, in response to said input, a call from said telecommunications terminal to a second private branch exchange whose address space does not contain M and does not contain a telephone number to which M is mapped; and
   (c) receiving at said telecommunications terminal, in response to said call, a signal from said second private branch exchange in accordance with a profile associated with said telephone number N.

2. The method of claim 1 wherein said second private branch exchange is selected from a plurality of private branch exchanges based on the network to which said telecommunications terminal is connected.

3. The method of claim 1 wherein said profile is kept in persistent storage only at said first private branch exchange.

4. The method of claim 1 wherein said profile is kept in persistent storage only at one or more nodes that are not private branch exchanges.

5. The method of claim 1 wherein said profile is not stored at said second private branch exchange prior to said telecommunications terminal's previous call to said second private branch exchange.

6. A method comprising:
   (a) receiving at a telecommunications terminal, at time $t_1$, a first input for placing a call to a first private branch exchange, wherein a telephone number M of said telecommunications terminal
      (i) is not in the address space of said first private branch exchange, and
      (ii) is mapped to a telephone number N in the address space of said first private branch exchange;
   (b) placing a call $C_1$ from said telecommunications terminal to said first private branch exchange in response to said first input;
   (c) receiving at said telecommunications terminal, in response to said call $C_1$, a signal from said first private branch exchange in accordance with a profile associated with said telephone number N;
   (d) receiving at said telecommunications terminal, at time $t_2$, a second input for placing a call to said first private branch exchange;
   (d1) determining whether to direct the call instead to a second private branch exchange;
   (e) placing, in response to said second input, a call $C_2$ from said telecommunications terminal to the second private branch exchange whose address space does not contain M and does not contain a telephone number to which M is mapped; and
   (f) receiving at said telecommunications terminal, in response to said call $C_2$, a signal from said second private branch exchange in accordance with said profile.

7. The method of claim 6 wherein said second private branch exchange is selected from a plurality of private branch exchanges based on the network to which said telecommunications terminal is connected at said time $t_2$.

8. The method of claim 6 wherein said profile is kept in persistent storage only at said first private branch exchange.

9. The method of claim 6 wherein said profile is kept in persistent storage only at one or more nodes that are not private branch exchanges.

10. The method of claim 6 wherein said profile is not stored at said second private branch exchange prior to said telecommunications terminal's previous call to said second private branch exchange.

11. A method comprising:
    (a) determining by use of a first signal whether it is advantageous for a wireless telecommunications terminal to direct a call to a first private branch exchange, wherein the determination is made in response to an input at said wireless telecommunications terminal for placing a call to a telephone number D that is in the address space of said first private branch exchange, and wherein a telephone number M of said wireless telecommunications terminal
       (i) is not in the address space of said first private branch exchange, and
       (ii) is mapped to a telephone number N in the address space of said first private branch exchange; and
    (b) determining by use of a second signal whether it is advantageous for the wireless telecommunications terminal to direct a call to a second private branch exchange, wherein the determination is made in response to the input at said wireless telecommunications terminal for placing a call to said telephone number D, and wherein D is not in the address space of said second private branch exchange.

12. The method of claim 11 further comprising:
    (c) transmitting from said first private branch exchange a third signal to said wireless telecommunications terminal in response to said first signal, wherein said third signal is in accordance with a profile that is associated with said telephone number N; and
    (d) transmitting from said second private branch exchange a fourth signal to said wireless telecommunications terminal in response to said second signal, wherein said fourth signal is in accordance with said profile.

13. The method of claim 12 wherein said profile is kept in persistent storage only at said first private branch exchange.

14. The method of claim 12 wherein said profile is kept in persistent storage only at one or more nodes that are not private branch exchanges.

15. The method of claim 12 wherein said profile is not stored at said second private branch exchange prior to the first time said wireless telecommunications terminal transmits a signal to said second private branch exchange.

16. The method of claim 11 wherein said telephone number D is associated with a feature offered by said first private branch exchange.

17. The method of claim 12 further comprising:
    (c) initiating a first execution of an authentication procedure in response to said first signal, to authenticate said wireless telecommunications terminal; and
    (d) initiating a second execution of said authentication procedure in response to said third signal, to authenticate said wireless telecommunications terminal.

18. The method of claim 17 further comprising:
    (e) transmitting from said first private branch exchange to said wireless telecommunications terminal, only after said first execution of said authentication procedure is successful, a third signal that is in accordance with a profile associated with said telephone number N; and
    (f) transmitting from said second private branch exchange to said wireless telecommunications terminal, only after said second execution of said authentication procedure is successful, a fourth signal that is in accordance with said profile.

19. The method of claim 17 wherein at least one of said first execution and said second execution of said authentication procedure is conducted by a node that is not a private branch exchange.

20. The method of claim 17 wherein said first execution and said second execution of said authentication procedure are both conducted by said first private branch exchange.

* * * * *